United States Patent
Kim

(10) Patent No.: US 6,515,644 B1
(45) Date of Patent: Feb. 4, 2003

(54) STATIC ELECTRICITY PREVENTION CIRCUIT IN LIQUID CRYSTAL DISPLAY

(75) Inventor: Jong Sung Kim, Goyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 240 days.

(21) Appl. No.: 09/665,110

(22) Filed: Sep. 20, 2000

(30) Foreign Application Priority Data

Sep. 21, 1999 (KR) .............................................. 99-40813

(51) Int. Cl.[7] ................................................. G09G 3/36
(52) U.S. Cl. .................................................... 345/87
(58) Field of Search ............................ 345/90, 98, 100, 345/87

(56) References Cited

U.S. PATENT DOCUMENTS 5,041,822 A  * 8/1991  Hayashi ...................... 345/206
5,936,687 A  * 8/1999  Lee .............................. 345/69
5,973,658 A  * 10/1999 Kim et al. ................... 345/100

* cited by examiner

Primary Examiner—Richard Hjerpe
Assistant Examiner—Naa-Oboshie Alexander-Reindorf
(74) Attorney, Agent, or Firm—McKenna Long & Aldridge LLP

(57) ABSTRACT

A static electricity prevention circuit in a liquid crystal display capable of restraining a badness generation caused by a static electricity during a manufacturing process thereof is disclosed. In the circuit, at least two transistors are connected, in parallel, between a common electrode line and gate lines and/or data lines. A capacitor is connected between the common electrode line and the gate lines and/or the data lines to discharge an over-current caused by a static electricity from any one of the common electrode line and the gate lines and/or the data lines into other electrode line. Accordingly, the present static electricity prevention circuit has a high impedance required in an operating voltage range of the LCD, whereas it has an earlier short due to an insulating breakdown than the thin film transistor array by virtue of a capacitor employing the passivation insulating film, whereby protecting the thin film transistor array from a static electricity.

6 Claims, 6 Drawing Sheets

STATIC ELECTRICITY PREVENTION CIRCUIT IN LIQUID CRYSTAL DISPLAY

BACKGROUND OF THE INVENTION

1. Field of the Invention

This invention relates to a liquid crystal display device, and more particularly to an static electricity prevention circuit for a liquid crystal display that can restrain a badness generation caused by a static electricity during a manufacturing process thereof.

2. Description of the Related Art

Generally, a static electricity prevention circuit has to protect a thin film transistor array and a panel as a picture display region from a static electricity, etc. during a manufacturing process of a liquid crystal display (LCD) and should not cause an interference and a disturbance to a driving signal system under normal driving environment. Thus, the static electricity prevention circuit must have an adaptive characteristic in accordance with a voltage region. In other words, the static electricity prevention circuit must have low impedance at a high voltage while having high impedance at a low voltage. Since the conventional static electricity prevention circuit has been designed such that one circuit system corresponds to all of the two voltage regions, however, it fails to meet all of the high voltage and low voltage characteristic. Particularly, it is difficult for the conventional static electricity prevention circuit to realize a low impedance characteristic required for a high voltage region caused by a static electricity. Hereinafter, a problem of the conventional static electricity prevention circuit will be described in detail with reference to the accompanying drawings.

As show in FIG. 1, each static electricity prevention circuit 10 in the LCD is usually connected between each gate line Gn to Gn+3 and a common electrode line C. The static electricity prevention circuit 10 serves as a resistor enough a large to make no affect to an internal driving of a thin film transistor array under a normal operating voltage level, and acts as a discharge path when an over-voltage caused by a static electricity is loaded at both terminals thereof, that is, between each gate line Gn to Gn+3 and the common electrode line C. To this end, the conventional static electricity prevention circuit includes two or three transistors as shown in FIG. 2 or FIG. 3, respectively.

The static electricity prevention circuit shown in FIG. 2 has first and second transistors T1 and T2 connected between the common electrode line C and the gate line G. The first transistor T1 is turned on when a voltage higher than an operating voltage is applied to the common electrode line C, thereby discharging a current from the common electrode line C, via the first transistor T1, into the gate line G. The second transistor T2 is turned on when a voltage higher than an operating voltage is applied to the gate line G, thereby discharging a current from the gate line G, via the second transistor T2, into the common electrode line C. Since voltages applied to the common electrode line C and the gate line G are lower than operating voltages of the first and second transistors T1 and T2 under normal driving environment, the first and second transistors T1 and T2 are turned off to make no effect to an internal driving of the thin film transistor array.

The static electricity prevention circuit shown in FIG. 3 has first to third transistors T1 and T3 connected between the common electrode line C and the gate line G. The first transistor T1 is turned on when a voltage higher than an operating voltage is applied to the common electrode line C to turn on the third transistor T3, thereby discharging a current from the common electrode line C, via the third transistor T#, into the gate line G. The second transistor T2 is turned on when a voltage higher than an operating voltage is applied to the gate line G to turn on the third transistor T3, thereby discharging a current from the gate line G, via the third transistor T3, into the common electrode line C. Since voltages applied to the common electrode line C and the gate line G are lower than operating voltages of the first to third transistors T1 to T3 under normal driving environment, the first to third transistors T1 and T3 are turned off to make no effect to an internal driving of the thin film transistor array.

However, the above-mentioned static electricity prevention circuits fail to perform a role of the discharge path sufficiently to cause an insulation breakdown because a current amount passing in the transistor, that is, in the static electricity prevention circuit is small when an excessive static electricity is generated. Thin film transistors included in the prevention circuit or thin film transistors in the thin film transistor array has the same gate insulating film. Accordingly, most insulating breakdown caused by a static electricity more than a critical value is generated at an inner side of the array or each intersection between the gate lines and the data lines rather than the static electricity prevention circuit. Since an open circuit rather than a short circuit is liable to be generated even though the insulation breakdown has been generated at the static electricity prevention circuit to fail to form a discharge path, it is impossible to prevent an over-current caused by a static electricity from being flowed into the thin film transistor array.

The conventional static electricity prevention circuit has a voltage to current characteristic as shown in FIG. 4. Referring to FIG. 4, it can be seen that, when a voltage at both terminals of the static electricity prevention circuit under normal driving is low, a current does almost not flow due to a high impedance characteristic. On the other hand, as a voltage at both terminals of the static electricity prevention circuit increase continuously, a discharge path is formed to increase a discharge current amount. But, if a voltage between said both terminals becomes more than about 100V, then a constant current of 0.01 mA flows. When a discharge current amount is small, the static electricity prevention circuit fails to perform a function of preventing a static electricity properly. Moreover, when a voltage between the both terminals is a voltage (i.e., 200V) more than a critical value, the circuit is opened due to an insulation breakdown to have infinite impedance. Thus, a discharge path is not formed to prevent a flow of current.

As described above, since the conventional static electricity prevention circuit failed to have a low impedance characteristic at a high voltage region and thus failed to protect the thin film transistor array from a static electricity properly, it was difficult to reduce a ratio of badness generation in the thin film transistor array caused by a static electricity.

SUMMARY OF THE INVENTION

Accordingly, it is an object of the present invention to provide a static electricity prevention circuit for a liquid crystal display wherein a device for confronting a high voltage is added so that a badness generation caused by a static electricity during a manufacturing process of the liquid crystal display can be restrained.

In order to achieve these and other objects of the invention, a static electricity prevention circuit for a liquid crystal display according to an embodiment of the present invention includes at least two transistor devices connected, in parallel, between a common electrode line and each of the gate lines and/or the data lines; and a capacitor device, being connected between the common electrode line and the gate lines and/or the data lines, to discharge an over-current caused by a static electricity from any one of the common electrode line and the gate lines and/or the data lines into other electrode line.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
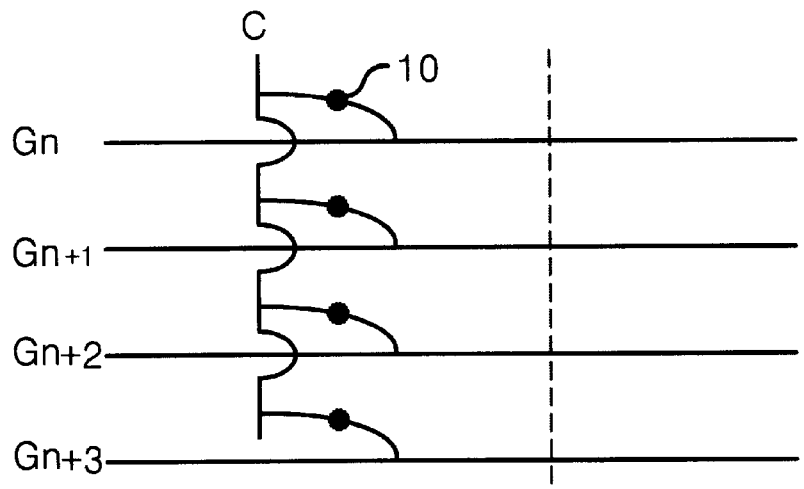
FIG. 1 is a schematic view showing a configuration of a static electricity prevention circuitry in a liquid crystal display.
Figure 2:
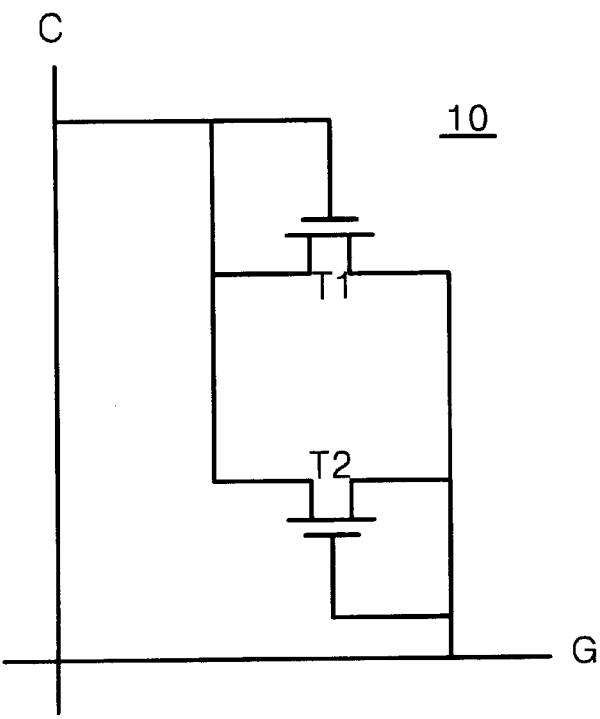
FIG. 2 is a detailed circuit diagram of a conventional static electricity prevention circuit.
Figure 3:
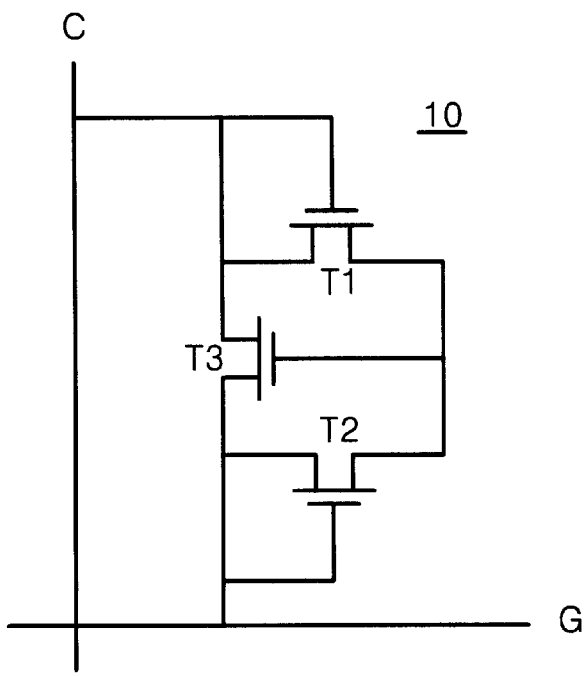
FIG. 3 is a detailed circuit diagram of another conventional static electricity prevention circuit.
Figure 4:
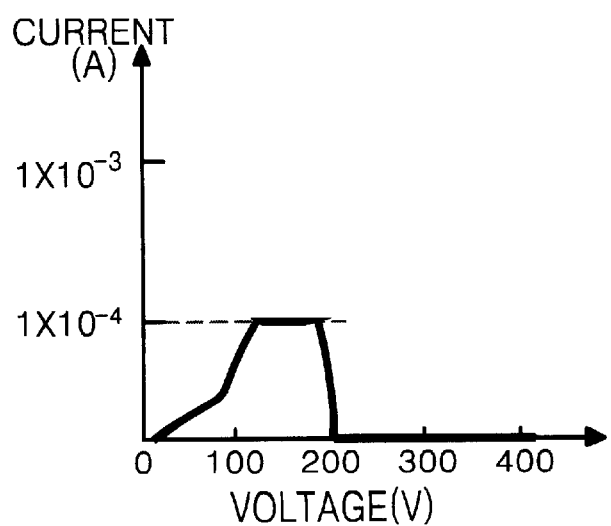
FIG. 4 is a graph representing a voltage to current characteristic of the conventional static electricity prevention circuit.
Figure 5:
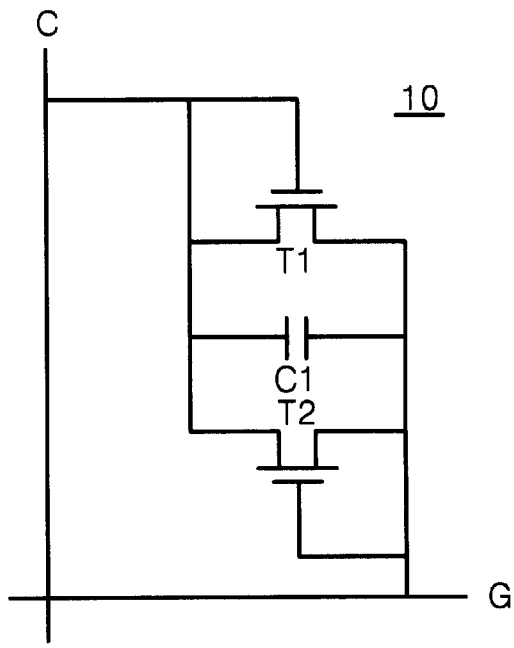
FIG. 5 is a detailed circuit diagram of a static electricity prevention circuit in a liquid crystal display according to a first embodiment of the present invention.

Referring to FIG. 5, there is shown a static electricity prevention circuit in a liquid crystal display according to a first embodiment of the present invention. The static electricity prevention circuit 10 includes first and second transistors T1 and T2 and a capacitor C1 connected, in parallel, between a common electrode line C and a gate line G. Herein, the first and second transistors has a high impedance characteristic in response to a low voltage while having a low impedance characteristic in response to a high voltage. Since a voltage applied to the common electrode line C and the gate line G is lower than a driving voltage thereof under normal driving environment, the first and second transistors T1 and T2 are turned off to make no effect to an internal driving of a thin film transistor array. When more than the driving voltage is loaded to the common electrode line C, the first transistor T1 is turned on to discharge a current from the common electrode line C, via the first transistor T1, into the gate line G. When more than the driving voltage is loaded to the gate line C, the second transistor T2 is turned on to discharge a current from the gate line G, via the second transistor T2, into the common electrode line C. When an over-voltage caused by a static electricity is applied between the common electrode line C and the gate line G, the capacitor C1 makes a breakdown easily to cause a short, thereby discharging an over-current through the capacitor C1.

Figure 6:
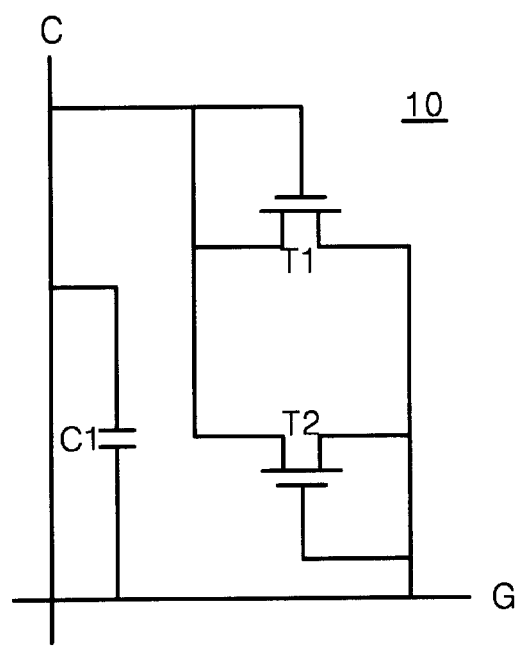
FIG. 6 is a detailed circuit diagram of a static electricity prevention circuit in a liquid crystal display according to a second embodiment of the present invention.

Such a capacitor C1 may be separated from the first and second transistors T1 and T2 to be connected between the common electrode line C and the gate line G like the second embodiment shown in FIG. 6. In this case, it is desirable that an insulating layer of the capacitor C1 is made from a passivation film liable to have a breakdown by being formed of $SiN_x$ or BCB (benzocyclobutene), etc. at a relatively low temperature rather than a gate insulating film having a dense organization by being formed of $SiN_x$ at a relatively high temperature. Accordingly, the static electricity prevention circuit has an earlier breakdown than the thin film transistor array due to an over-voltage to be shorted, thereby allowing an over-current caused by a static electricity to be discharged. As a result, the static electricity prevention circuit can protect the thin film transistor array from an over-voltage caused by a static electricity.

Figure 7:
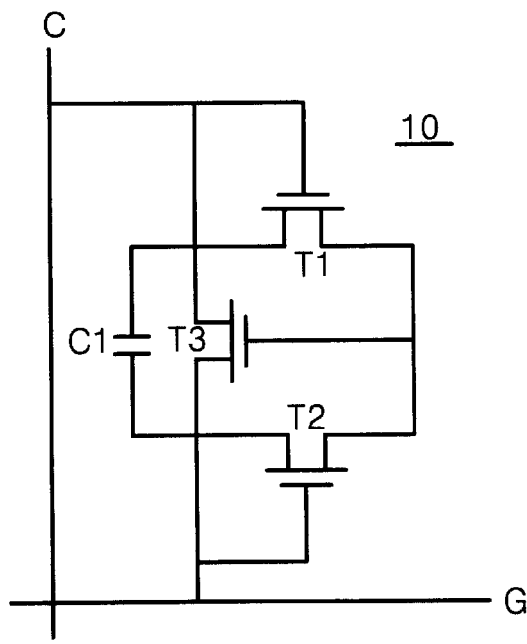
FIG. 7 is a detailed circuit diagram of a static electricity prevention circuit in a liquid crystal display according to a third embodiment of the present invention.
Figure 8:
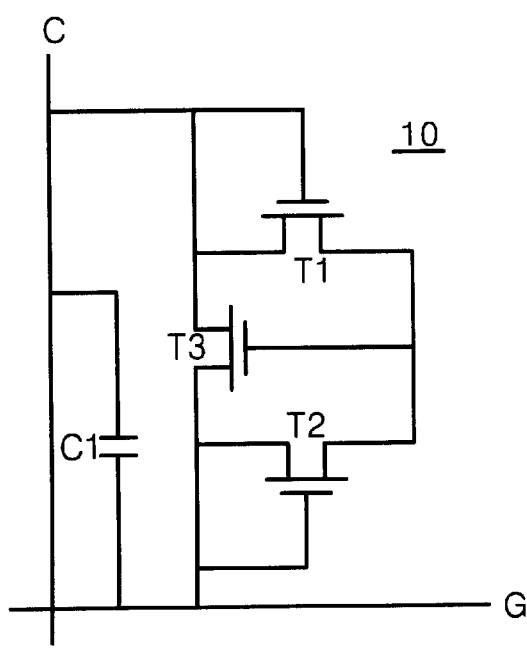
FIG. 8 is a detailed circuit diagram of a static electricity prevention circuit in a liquid crystal display according to a fourth embodiment of the present invention.

Referring to FIG. 7, there is shown a static electricity prevention circuit in a liquid crystal display according to a third embodiment of the present invention. The static electricity prevention circuit 10 includes first to third transistors T1 to T3 connected to a common electrode line C and a gate line G, and a capacitor C1 connected, in parallel, to the third transistor T3. The first to third transistors T1 to T3 are turned off under normal driving environment to make no effect to an internal driving of a thin film transistor array. When more than the driving voltage is loaded to the common electrode line C, the first transistor T1 turns on the third transistor T3 to discharge a current from the common electrode line C, via the third transistor T3, into the gate line G. When more than the driving voltage is loaded to the gate line G, the second transistor T2 is turned on and thus the third transistor T3 is turned on to discharge a current from the gate line G, via the third transistor T3, into the common electrode line C. When an over-voltage caused by a static electricity is applied between the common electrode line C and the gate line G, the capacitor C1 makes a breakdown easily to cause a short, thereby discharging an over-current through the capacitor C1. Such a capacitor C1 may be separated from the first to third transistors T1 to T3 to be directly connected between the common electrode line C and the gate line G like the fourth embodiment shown in FIG. 8. In this case, it is desirable that an insulating layer of the capacitor C1 is made from a passivation film liable to have a breakdown by being formed of $SiN_x$ or BCB (benzocyclobutene), etc. at a relatively low temperature rather than a gate insulating film having a dense organization by being formed of $SiN_x$ at a relatively high temperature. Accordingly, the static electricity prevention circuit has an earlier breakdown than the thin film transistor array due to an over-voltage to be shorted, thereby allowing an over-current caused by a static electricity to be discharged. As a result, the static electricity prevention circuit can protect the thin film transistor array from an over-voltage caused by a static electricity.

Figure 9:
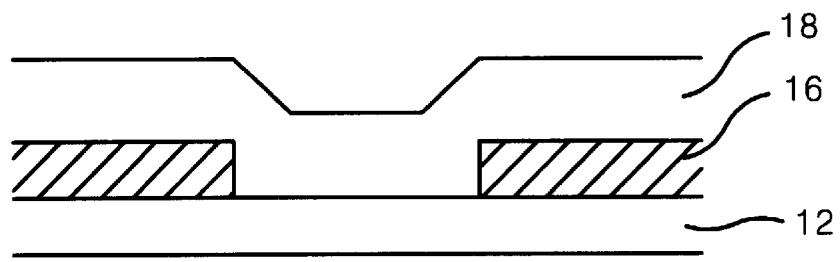
FIG. 9 is a section view representing a first embodiment of the capacitor structure shown in FIG. 5 to FIG. 8.
Figure 10:
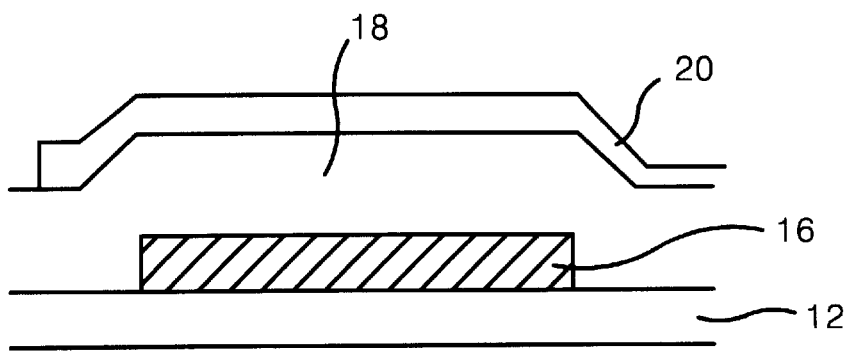
FIG. 10 is a section view representing a second embodiment of the capacitor structure shown in FIG. 5 to FIG. 8.
Figure 11:
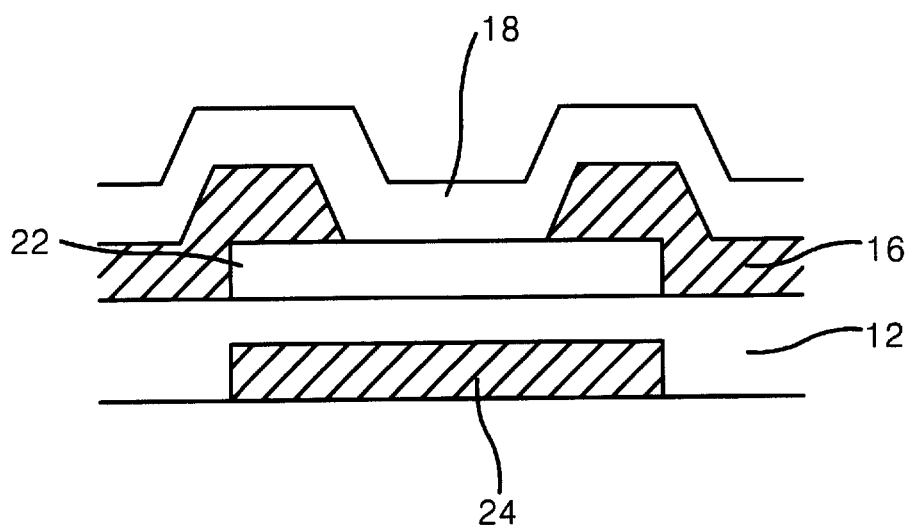
FIG. 11 is a section view representing a third embodiment of the capacitor structure shown in FIG. 5 to FIG. 8.
Figure 12:
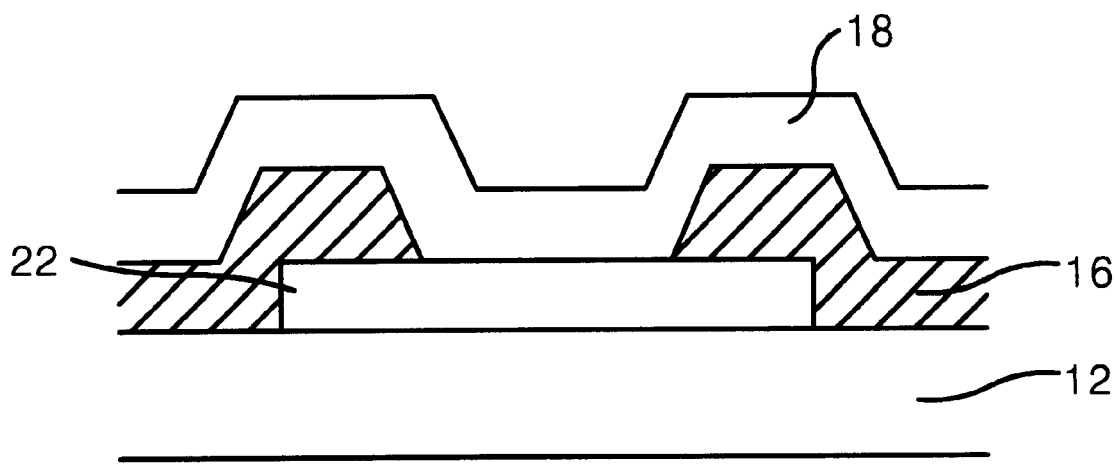
FIG. 12 is a section view representing a fourth embodiment of the capacitor structure shown in FIG. 5 to FIG. 8.

Meanwhile, the above-mentioned capacitor as a device for coping with a high voltage can have various structures as shown in FIG. 9 to FIG. 12. Referring to FIG. 9, the capacitor C1 is formed into a horizontal structure by source/drain electrodes 16 arranged, in parallel, on a gate insulating film 12 in the horizontal direction and a passivation film 18 coated thereon. Referring to FIG. 10, the capacitor C1 is formed into a vertical structure by a source/drain electrode 16, a passivation film 18 and a transparent electrode 20 that are disposed sequentially on a gate insulating film 12. Further, as shown in FIG. 11 and FIG. 12, the capacitor C1 may be formed into a horizontal structure by a semiconductor layer 22 provided on a gate insulating film 12, source/drain electrodes 16 provided at each side of the semiconductor layer 22 and a passivation film 18 disposed on the semiconductor layer 22 and the source/drain electrodes 16. The semiconductor layer 22 formed between the source/drain electrodes 16 allows the capacitor C1 to have a better insulation breakdown characteristic at a high voltage, thereby causing a short easily. Alternately, a gate electrode 24 may be arranged at the lower portion of the gate insulating film 12 as shown in FIG. 11.

Figure 13:
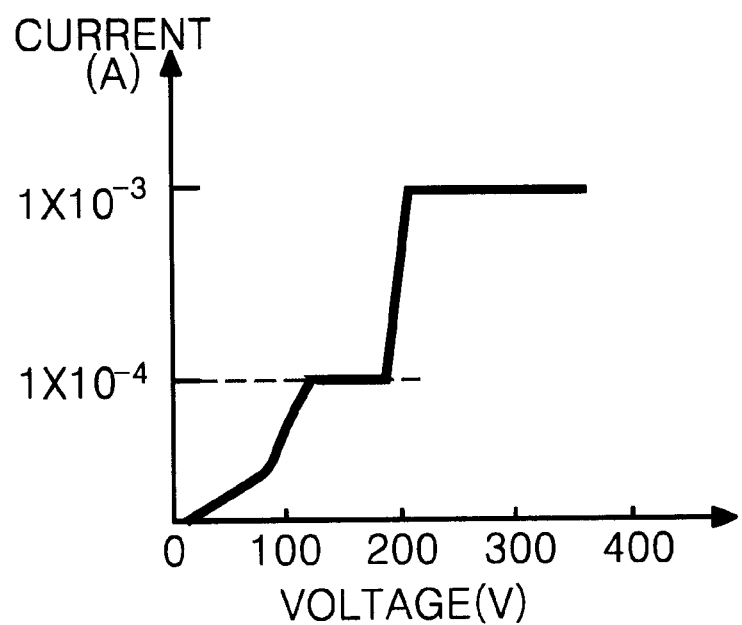
FIG. 13 is a graph representing a voltage to current characteristic of a static electricity prevention circuit according to the present invention.

The present static electricity prevention circuit including such a capacitor C1 has a voltage to current characteristic as shown in FIG. 13. As can be seen from FIG. 13, when a voltage at both terminals of the static electricity prevention circuit is low upon normal driving, an impedance is high and thus a current does not almost flow. On the other hand, as a voltage at both terminals of the static electricity prevention circuit increase continuously, a discharge path is formed to increase a discharge current amount. But, if a voltage between said both terminals becomes more than about 100V, then a constant current of 0.01 mA flows. Furthermore, when a voltage between said both terminals becomes a voltage (i.e., 100 to 300V) more than a critical value, the capacitor C1 is shorted by a insulating breakdown to discharge an over-current of about 0.1 mA.

As a result, the present static electricity prevention circuit has a high impedance characteristic required in an operating voltage range of the LCD, and is shorted due to an insulating breakdown by virtue of the capacitor employing the passivation insulating film under the high voltage environment caused by the static electricity generation to meet a low impedance characteristic.

As described above, the static electricity prevention circuit according to the present invention has a high impedance required in an operating voltage range of the LCD, whereas it has an earlier short due to an insulating breakdown than the thin film transistor array by virtue of a capacitor employing the passivation insulating film. Accordingly, the present static electricity prevention circuit can protect the thin film transistor array from a static electricity to restrain a badness generation caused by a static electricity.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A static electricity prevention circuit for a liquid crystal display being connected between a common electrode line and gate lines and/or data lines in the liquid crystal display, said circuit comprising:

at least two transistor devices connected, in parallel, between the common electrode line and the gate lines and/or the data lines; and a capacitor device, being connected between the common electrode line and the gate lines and/or the data lines, to discharge an over-current caused by a static electricity from any one of the common electrode line and the gate lines and/or the data lines into another one of common electrate line.

2. The static electricity prevention circuit as claimed in claim 1, wherein an insulating layer of the capacitor device is formed of a passivation film.

3. The static electricity prevention circuit as claimed in claim 2, wherein the capacitor device comprises:

source/drain electrodes arranged in parallel and in the horizontal direction; and said passivation film provided between the source/drain electrodes and/or at the upper portions of the source/drain electrodes.

4. The static electricity prevention circuit as claimed in claim 3, wherein the capacitor device further comprises:

a semiconductor layer provided between the source/drain electrodes.

5. The static electricity prevention circuit as claimed in claim 2, wherein the capacitor device comprises:

a source/drain electrode and a transparent electrode arranged in parallel and in the vertical direction; and said passivation film provided between the source/drain electrode and the transparent electrode.

6. The static electricity prevention circuit as claimed in claim 1, wherein the capacitor device is connected, in parallel, to the transistor devices.

* * * * *